United States Patent [19]

Lewis

[11] Patent Number: 4,622,924
[45] Date of Patent: Nov. 18, 1986

[54] HYDROGEN ENGINE

[76] Inventor: William N. Lewis, Rte. 4, Box 1090, Baxley, Ga. 31513

[21] Appl. No.: 505,781

[22] Filed: Jun. 20, 1983

[51] Int. Cl.[4] .................................................. F02B 43/08
[52] U.S. Cl. ................................ 123/3; 123/DIG. 12; 423/652
[58] Field of Search .................. 123/1 A, 3, DIG. 12, 123/196 AB; 60/649; 423/648 R, 657, 658, 652, 650

[56] References Cited

U.S. PATENT DOCUMENTS

| 1,619,978 | 3/1927 | Hunt | 123/196 AB |
|---|---|---|---|
| 3,904,744 | 9/1975 | Pagel | 423/652 |
| 3,968,775 | 7/1976 | Harpman | 123/3 |
| 3,992,165 | 11/1976 | Newkirk | 123/3 |
| 4,003,343 | 1/1977 | Lee | 123/3 |
| 4,036,181 | 7/1977 | Matovich | 123/3 |
| 4,037,568 | 7/1977 | Schreiber | 123/3 |
| 4,099,489 | 7/1978 | Bradley | 123/3 |
| 4,220,518 | 9/1980 | Uchida et al. | 423/658 |
| 4,380,970 | 4/1983 | Davis | 123/3 |

Primary Examiner—William A. Cuchlinski, Jr.
Attorney, Agent, or Firm—Thomas & Kennedy

[57] ABSTRACT

Hydrogen and oxygen are dissociated from water by converting water to steam and contacting the steam with resin or oil. Hydrogen is fed as it is dissociated into an internal combustion engine for combustion.

10 Claims, 3 Drawing Figures

HYDROGEN ENGINE

TECHNICAL FIELD

This invention relates to methods and apparatuses for generating hydrogen and for utilizing hydrogen as a fuel for internal combustion engines.

BACKGROUND OF THE INVENTION

Upon combustion hydrogen releases a substantial amount of energy which may be utilized in the generation of power. However, since it is a chemically active element and therefore not available in the free state in nature in elemental gaseous form, it must be produced and stored for utilization in engines.

In general, hydrogen is obtained from compounds by breaking chemical bonds. This, of course, requires a substantial amount of energy to accomplish. Though there are many ways of liberating hydrogen from hydrocarbons, acids, bases and water, it is usually obtained in commercial quantities from water or petroleum. From hydrocarbons a mixture of methane and steam is typically heated to a high temperature in the presence of catalysts in producing large quantities of hydrogen. From water hydrogen is produced by electrolysis.

Methods of producing hydrogen are more specifically exemplified in U.S. Pat. Nos. 3,699,718, 3,786,138, 3,816,609, 3,859,373, 4,069,304 and 4,202,744. These methods generally include steam-light hydrocarbon reforming, partial oxidation of hydrocarbons and other carbonaceous matter, and coal gasification (the Kellogg process).

To date, hydrogen engines have had only very limited and specialized use, such as in propelling rockets and missiles and other military applications. They have not found general use as power sources for driving vehicles over public roads for a number of reasons. Probably foremost among such reasons is the danger associated with the use of hydrogen for its propensity to combust and release vast amounts of energy in violent reactions. To transport gaseous hydrogen in a storage tank in vehicles would thus create a very substantial danger to the motoring public. Another reason is that the expense and storage space requirements involved are too high where hydrogen is to be produced from hydrocarbons such as methane. Liquid water would not, of course, present a storage or expense problem. However, the rate by which hydrogen could be produced from water by electrolysis would be insufficient for use as an automative engine fuel.

Accordingly, it is to the provision of methods and apparatuses for producing hydrogen and utilizing it as it is generated as a fuel in internal combustion engines to which the present invention is primarily directed.

SUMMARY OF THE INVENTION

In one form of the invention, a gas generation process comprises the steps of forming a stream of steam at a temperature of between 500° F. and 900° F. and passing the stream through a body of oil or resin whereupon the stream of steam is at least partially dissociated into hydrogen and oxygen.

In another form of the invention a power generation process comprises the steps of forming a stream of steam at a temperature of between 500° F. and 900° F., contacting the stream with resin or oil whereupon hydrogen is dissociated from oxygen, and igniting the hydrogen.

In another form of the invention a power generation process is provided wherein hydrogen is generated and used as engine fuel at substantially the same rates of generation and fuel utilization so that hydrogen storage may be substantially avoided. The process comprises the steps of introducing water into a hydrogen-oxygen dissociation apparatus through valve means controlled by an engine throttle, dissociating hydrogen and oxygen in the dissociation apparatus, and feeding the hydrogen as it is being generated into the engine.

In yet another form of the invention, a power generation system comprises an internal combustion engine, a fuel tank adapted to hold a supply of water, and a hydrogen-oxygen dissociation chamber containing a supply of oil or resin. The system further includes first conduit means for feeding water from the fuel tank to the hydrogen-oxygen dissociation chamber, heating means for converting water being fed through the conduit means from a liquid to a gaseous phase, and second conduit means for feeding hydrogen generated in the hydrogen-oxygen dissociation chamber to the internal combustion engine for combustion therein.

In still another form of the invention apparatus for dissociating hydrogen and oxygen comprises a chamber housing oil or resin and conduit means passing through the chamber through which hot gases may be passed to heat the oil or resin. A pipe is thermally coupled and placed in communication with the chamber which pipe contains a mass of particulates into which water may be fed and phase changed into steam upon contact with particulates that have been heated by thermal conduction from the chamber and the steam passed into the camber and into contact with the oil or resin.

DETAILED DESCRIPTION

Figure 1:
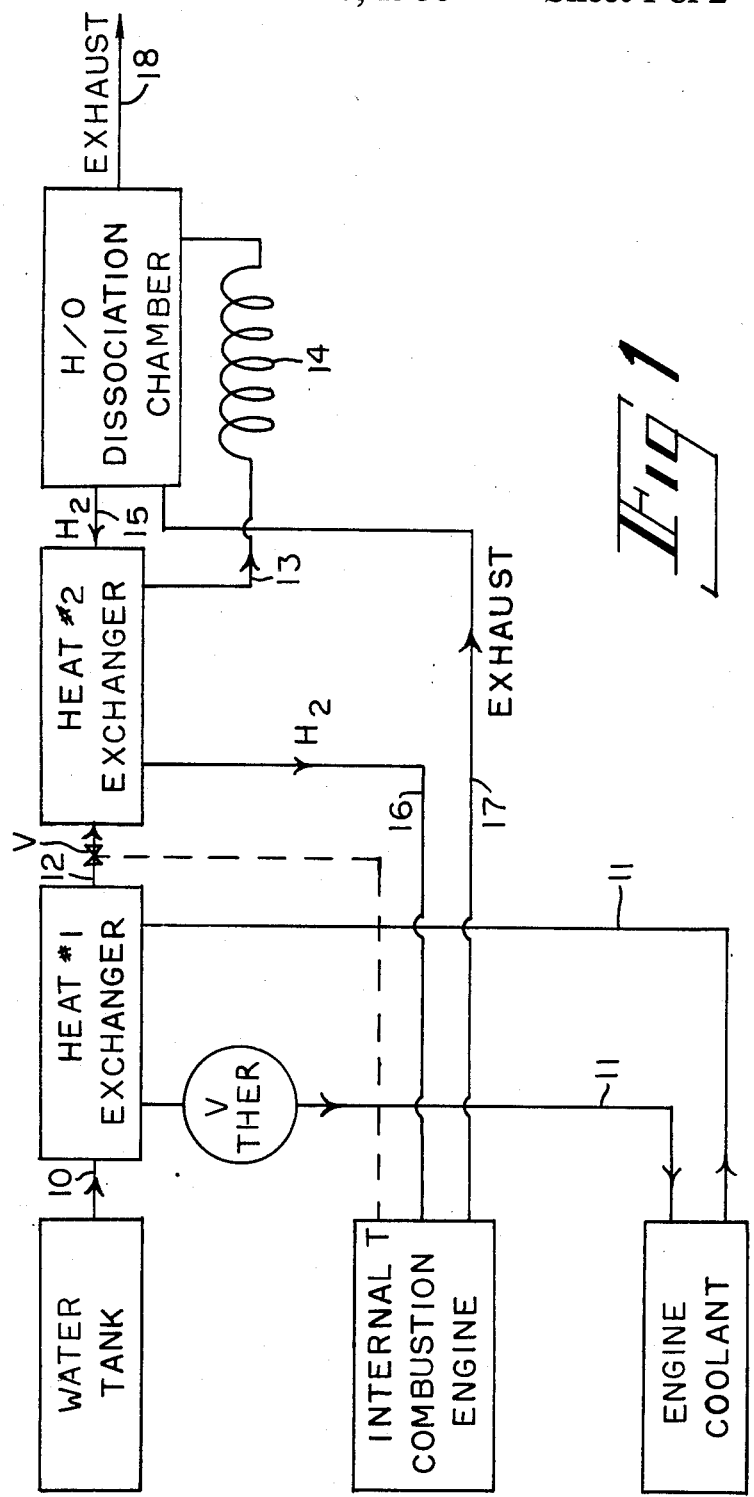
FIG. 1 is a schematic diagram of a system embodying principles of the invention which may be used in practicing processes of the invention.

With reference to the schematic diagram presented in FIG. 1, a hydrogen engine that includes a hydrogen generation system is seen to include an internal combustion engine such as that conventionally used in powering an automotive vehicle which has a throttle T and which is water cooled with a conventional engine coolant system. A fuel tank is provided which houses a supply of water. A conduit 10 extends from the water tank to a first heat exchanger that is coupled with the engine coolant system via a system of conduits 11 in which a thermionic valve is employed. A conduit 12 extends from the first heat exchanger in fluid communication with conduit 10 to a second heat exchanger through a valve V that is coupled with and controlled by the internal combustion engine throttle T. Another conduit 13 extends from the second heat exchanger in fluid communication with conduit 12 to a convoluted conduit 14 which is in fluid communication with a hydrogen-oxygen dissociation chamber. A conduit 15 extends from the dissociation chamber back to the second heat exchanger in fluid communication with another conduit 16 that extends from the second heat exchanger to the internal combustion engine. Within the internal combustion engine itself the conduit 16 is connected to the carburation or fuel injection subsystem. Finally, another conduit 17 extends from the engine exhaust system of the internal combustion engine to the dissociation chamber and into communication with an exhaust pipe 18.

Figure 2:
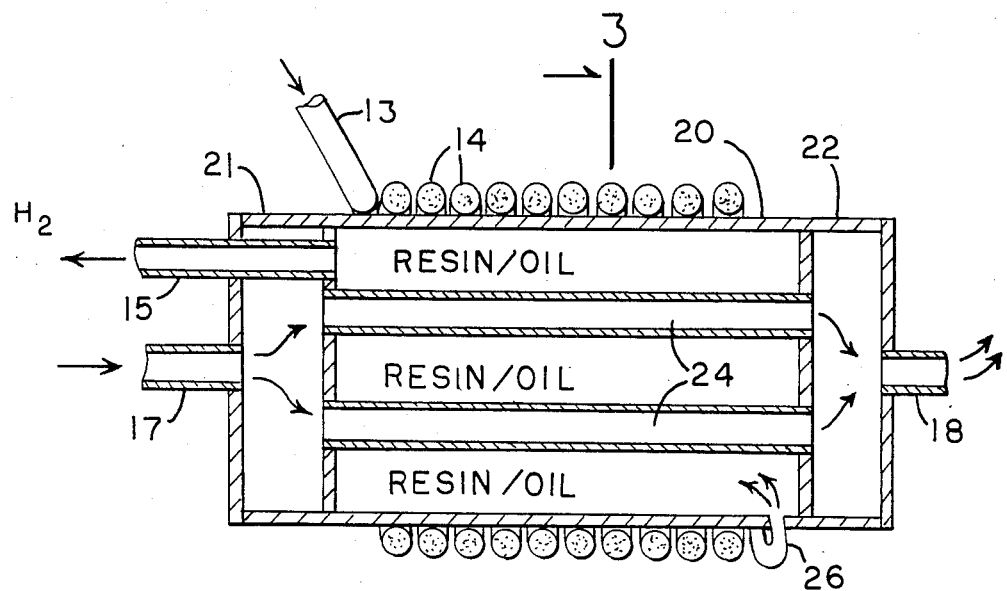
FIG. 2 is a cross-sectional view of apparatus for dissociating hydrogen from oxygen in accordance with principles of the invention.
Figure 3:
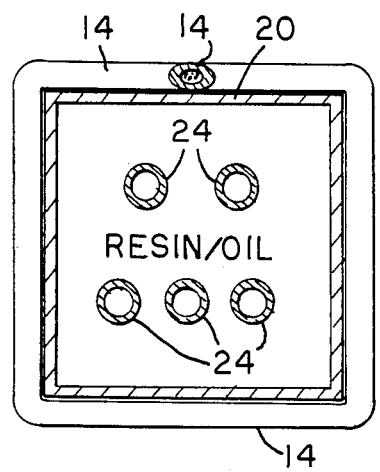
FIG. 3 is a cross-sectional view taken along plane 3—3 of the apparatus illustrated in FIG. 2.

With reference next to FIGS. 2 and 3 the hydrogen-oxygen dissociation chamber is seen to include a tank 20 to one end of which an intake manifold 21 is secured and to the opposite end of which an outlet manifold 22 is secured. Five pipes 24 extend through the tank 20 between the two manifolds. The conduit 17 is seen to be connected with the intake manifold while the tail pipe 18 is coupled with the outlet manifold. The conduit 13 is seen to merge into the convoluted form of the conduit 14 which is wrapped tightly around the tank 20 so as to be thermally coupled with it. Within the convoluted conduit 14 is packed a mass of particulates such as common iron-bearing rocks. The end of the convoluted conduit is provided with an elbow joint 26 through which fluids may be inputted into the bottom of the tank 20.

The conduit 15 is seen to extend from the tank 20 through the intake manifold to the second heat exchanger. The tank 20 houses a supply of resin or oil. Various kinds of oils may be employed such as mineral oils and petroleum oils. The preferred resin is a gum or pine tar resin although soybean oil may also be used. The gum resin may be obtained from Southern, yellow or long-leaf pine trees.

Prior to operation the resin or oil within the hydrogen-oxygen dissociation chamber is preheated to a temperature of between 500° F. and 900° F. as by the use of an unshown auxiliary preheat means of conventional construction. The temperature of the resin should be at least 500° F. since below that temperature efficiency goes down in that an insufficient quantity of hydrogen is generated. Conversely, above approximately 900° F., depending upon the particular resin or oil employed, that resin or oil may tend to break down into another state.

Once the resin or oil has achieved the proper temperature the engine is operated in the following manner. Water is fed as by unshown pump means from the water tank to the dissociation chamber through the conduits 10, 12 and 15, the two heat exchangers and the valve V. In passing through the first heat exchanger the water is preheated from the heat of the engine coolant. The water is then fed through the valve V to the second heat exchanger with the valve V being controlled by the position of the engine throttle T. From the second heat exchanger the water is fed through conduit 13 and into the convoluted pipe 14 where it comes into contact with the heated mass of particulates and is converted to a low pressure stream of steam. From here the low pressure stream of steam passes slowly through the body of resin or oil within the hydrogen dissociation chamber. Upon contact with the resin or oil the steam is dissociated into hydrogen and oxygen.

From the dissociation chamber the dissociated hydrogen and oxygen passes through a conduit 15 to the second heat exchanger wherein the hydrogen is cooled down somewhat from its 600° F. temperature. The hydrogen is then fed directly through conduit 16 into the fuel intake system of the engine where it is ignited to produce energy in driving the internal components of the engine. The heat from the exhaust passes through the conduit 17 and into the intake manifold 21 and through pipes 24 within the tank 20 and from there through the outlet manifold to the tail pipe 18. This heat is transmitted to the body of resin or oil in maintaining its proper temperature.

It is not fully understood how hydrogen and oxygen is dissociated with the just-described system since the temperatures involved are substantially less than that previously thought necessary to produce the energy levels required in breaking the oxygen-hydrogen bond. Apparently the low pressure stream of steam, however, when brought into contact with the surface of the resin or oil, is catalyzed in some manner so that the required temperature to produce the necessary energy is lowered. In any event, the system and process has been found to work well in propelling automobiles over roads solely with a supply of water being used as the engine fuel in addition to the supply of resin and oil, and the use of an auxiliary preheating system.

OPERATIVE EXAMPLE

The just described power generation apparatus has been successfully used by mounting it upon an approximately 4,000 pound Ambassador model automobile sold by American Motors Corporation with the hydrogen engine's dissociation chamberoriented vertically and less than half filled with 8 pounds of standard grade (Marion) pine resin and with the steam generating pipe filled with iron rocks. The Ambassador's standard 232 cubic inch internal combustion engine was fueled solely with gases generated by the hydrogen engine. The resin and tap water were both heated to approximately 600° F. and water fed to the dissociation chamber at a rate of 1 gal/hour. Steam was developed at 5 pounds/square inch and passed through the resin continuously for a period of approximately 2 hours while the automobile was being driven upon public roads at an average speed of 60 miles per hour. The temperature of the steam was found to drop from approximately 600° F. to approximately 500° as it passed through the second heat exchanger. Water was consumed at a rate of approximately 1 gal/hour and resin consumed at a rate of approximately ½ pound/hour.

It should be understood that the just-described embodiment merely illustrated principle of the invention in one particular form. Many modifications, additions or deletions may, of course, be made thereto without departure from the spirit and scope of the invention as set forth in the following claims.

I claim:

1. A gas generation process comprising the steps of forming a stream of steam at a temperature of between 500° F. and 900° F. and passing the stream through a body of oil or resin whereupon the stream of steam is at least partially dissociated into hydrogen and oxygen.

2. The gas generation process of claim 1 wherein the stream of steam is passed through a body of gum resin.

3. The gas generation process of claim 1 wherein the stream of steam is passed through a body of pine resin.

4. A power generation process comprising the steps of forming a stream of steam at a temperature of between 500° F. and 900° F.; contacting the stream with resin or oil whereupon hydrogen is dissociated from oxygen; and igniting the hydrogen.

5. The power generation process of claim 4 where the stream of steam is passed through a body of resin.

6. The power generation process of claim 4 wherein the stream of steam is passed through a body of oil.

7. The power generation process of claim 4 wherein the hydrogen is ignited in an internal combustion engine.

8. A power generation process wherein hydrogen is generated and used as engine fuel at substantially the same rates of generation and fuel utilization so that storage may be substantially avoided, and with said process comprising the steps of introducing water into a hydrogen-oxygen dissociation apparatus through valve means controlled by an engine throttle, dissociating hydrogen and oxygen in the dissociation apparatus by vaporizing the water to stream at a temperature of between 500° F. and 900° F. and contacting the steam with oil or resin, and feeding the hydrogen as it is generated into the engine for combustion therein.

9. Apparatus for dissociating hydrogen and oxygen comprising a chamber housing oil or resin; conduit means passing through said chamber through which hot gases may be passed to heat said oil or resin; a first pipe in communicatioon with a water tank and thermally coupled and communicating with said chamber, said first pipe containing a mass of particulates into which water may be fed and phase-changed into steam upon contact with particulates that have been heated by thermal conduction from said chamber and the steam passed into the chamber and into contact with the oil or resin; and a second pipe communicating with said chamber through which hydrogen and oxygen dissociated from steam contacted with said oil or resin within said chamber may be conveyed out of said chamber.

10. The apparatus of claim 9 cherein said pipe is convoluted about said dissociation chamber.

* * * * *